May 7, 1940.   B. A. SWENNES   2,199,926
RESILIENT SLIP JOINT
Filed July 19, 1937
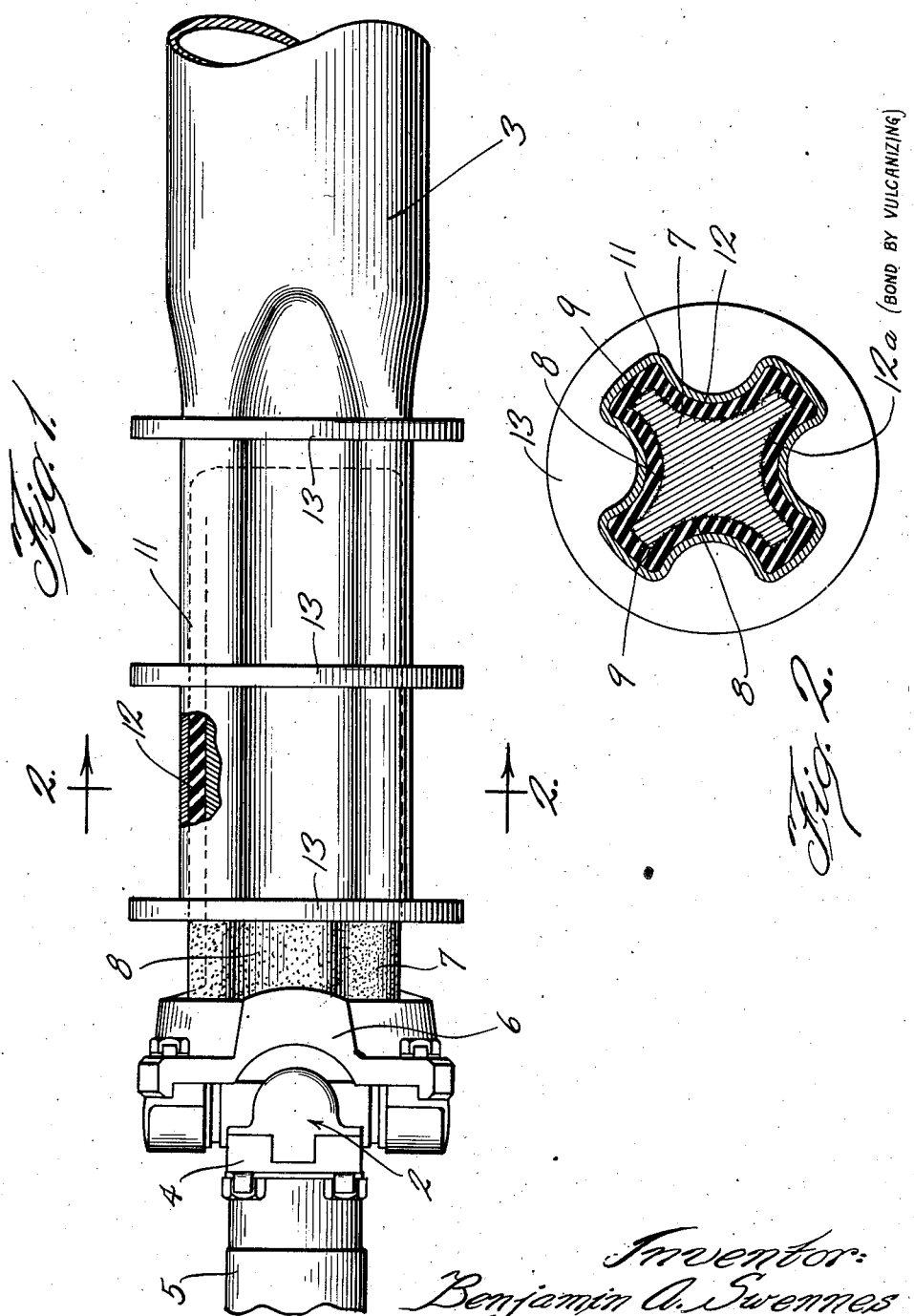

Patented May 7, 1940

2,199,926

UNITED STATES PATENT OFFICE 2,199,926

RESILIENT SLIP JOINT

Benjamin A. Swennes, Rockford, Ill., assignor to Borg-Warner Corporation, Chicago, Ill., a corporation of Illinois Application July 19, 1937, Serial No. 154,401

6 Claims. (Cl. 64—23)

My invention relates to improvements in resilient slip joints and more particularly to a resilient slip joint for use in providing a driving connection between the universal joint yoke and torque tube assembly of a motor vehicle drive.

An object of my invention is to provide an improved resilient slip joint, as described, employing a relatively soft resilient cushion that is disposed between the cooperating torque transmitting elements of the slip joint in such manner as to provide relatively large surface to surface contact, thereby to prolong the useful life of the resilient cushion.

Another object is to provide an improved resilient slip joint, as described, that is so constructed as to assure precise concentricity between the torque tube carrying one element of the slip joint and the universal joint yoke assembly carrying the other element of the joint.

A further object is to provide an improved resilient slip joint, as described, wherein the resilient cushion between the drive elements of the joint is so arranged as to transmit torque from one element thereof to the other by compression.

Other objects, the advantages and uses of the invention will become apparent after reading the following specification and claims, and after consideration of the drawing forming a part of this specification, wherein Fig. 1 is a side elevation of a universal joint and torque tube assembly having incorporated therein my improved resilient slip joint, and Fig. 2 is a sectional view along the line 2—2 of Fig. 1.

I have selected for illustration herein an adaptation of my improved slip joint to the universal joint torque tube assembly of a motor vehicle, and with reference to Fig. 1, such assembly may comprise a universal joint 2 of the Cardan type such as illustrated in Carl E. Swenson U. S. Letters Patent No. 1,985,669, issued December 25, 1934, and a torque tube 3 adapted at one end (not shown) for connection with the differential gear assembly of the motor vehicle. The universal joint 2 may have one of its yoke arms 4 adapted for connection through an axially extending shaft portion 5 to the drive shaft of the motor vehicle transmission (not shown). The opposite yoke arm 6 of the universal joint carries a substantially elongated shaft portion 7 formed in cross section, as illustrated in Fig. 2, to provide a plurality of semi-cylindrical depressed surfaces 8 on its outer wall, the longitudinal axes of which are parallel with the axis of the yoke arm assembly 6. The surfaces 8 are arranged at equal distances from one another about the circumference of the shaft portion 7 thus to provide therebetween radially extending ribs 9 also parallel to the axis of rotation of the shaft.

The outer diameter of the shaft 7 is preferably slightly less than the internal diameter of the torque tube 3 at 11 or that end adjacent to the universal joint 2. The end portion 11 of the torque tube 3 is formed in cross section to follow the contour of the outer surface of the shaft 7 as indicated in Fig. 2, and is of such size as to provide a space between the adjacent walls of the overlapping portions of the tube 3 and shaft 7 sufficient to admit therebetween a resilient rubber cushion 12 of substantially uniform wall thickness. I prefer to bond the cushion 12 directly to the outer surface of the shaft 7 as indicated at 13 by vulcanizing the rubber directly to the metal surface of the shaft. This construction permits of a slip to occur between the portion 11 of the torque tube 3 and the rubber cushion 12 permanently fixed to the shaft 7, such slip occurring parallel to the axis of the shaft 7 and in line with the center of the universal joint 2.

In order that the deformed portion 11 of the torque tube 3 may not expand under high torque application, I provide a plurality of restraining rings 13 having central openings therethrough conforming in contour to the contour of the outer wall of the tube portion 11. Such rings may be secured in place by hot press fit, or by welding, thus to provide a permanent reenforcing for the torque tube element of the slip joint. As indicated in dotted lines, I prefer to form the shaft 7 of a length such as to extend slightly short of the innermost of the rings 13 when the parts of the joint are disposed in their normal positions, as indicated in Fig. 1, thus providing for slip in either direction.

A resilient slip joint constructed as herein described provides in addition to adequate torque transmitting quality by virtue of its relatively large surfaces between which torque may be transmitted through cushion compression, a joint that possesses the further and advantageous quality of dampening torsional vibration, thus to render the functioning of the drive assembly between universal joint and torque tube quiet in operation. It has been my observation that the provision of relatively large contacting surfaces between which the rubber cushion is disposed prolongs the useful life of the cushion because of the relatively wide distribution of pressure over the extensive cushion surface. At no time during normal operation is the cushion compressed to a point near to its limits of compression, a condition which if brought about might readily destroy the resiliency of the cushion.

Inasmuch as I have done away completely with the machining of splines upon torque tube, joint element and universal yoke assembly, the cost of manufacture of my improved slip joint is believed to be considerably reduced with respect to the cost of the conventional type of splined joint which requires accurate machining in order to avoid undue friction, and which does not serve as a torsional dampening drive connection.

I claim:

1. In combination, a universal joint having a yoke assembly, a stub shaft extending axially from said yoke assembly, a tubular propeller shaft having one end thereof overlapping said stub shaft and arranged with its inner wall spaced from the outer wall of the stub shaft, said stub shaft and overlapping portion of said propeller shaft being non-circular in cross section uniformly throughout the overlapping portions thereof, and a resilient cushion interposed in the space between the stub shaft and propeller shaft portion whereby torque may be transmitted between the shafts through said cushion, said cushion being permanently bonded to one only of the overlapping shaft portions and free to slide axially relative to the other.

2. The combination defined in claim 1, wherein the resilient cushion is permanently fixed to the outer surface of the stub shaft and is free to slide relative to said propeller shaft, thereby to permit the propeller shaft to slide axially over the cushion on said stub shaft.

3. In combination, a universal joint having a yoke assembly, a stub shaft extending axially from said yoke assembly, a tubular propeller shaft having one end thereof overlapping said stub shaft and arranged with its inner wall spaced from the outer wall of the stub shaft, said stub shaft and overlapping portion of said propeller shaft being non-circular in cross section uniformly throughout the overlapping portions thereof, a resilient cushion interposed in the space between the overlapping shaft portions whereby torque may be transmitted between the shaft through said cushion, and reenforcing rings secured about the outer wall of the overlapping portion of the propeller shaft whereby to restrain said shaft portion against outward expansion.

4. The combination defined in claim 3, wherein the cross section of the overlapping stub shaft and said propeller shaft portion is substantially X-shaped in contour.

5. The combination defined in claim 3, wherein the resilient cushion comprises a rubber sheath of substantially uniform thickness vulcanized to the outer surface of the stub shaft and free to slide relative to the overlapping portion of the propeller shaft.

6. The combination defined in claim 1, wherein any inside diameter of the overlapping propeller shaft is greater than the corresponding outside diameter of said stub shaft by substantially twice the thickness of said cushion, said difference being substantially uniform for all corresponding diameters of said overlapping shafts, whereby to reduce error in concentricity of the overlapping portions of said shafts relative to the axis of rotation of the parts.

BENJAMIN A. SWENNES.